(12) United States Patent
Schalles

(10) Patent No.: US 11,519,794 B2
(45) Date of Patent: Dec. 6, 2022

(54) DEVICE AND METHOD FOR THE IN-SITU CALIBRATION OF A THERMOMETER

(71) Applicant: Endress+Hauser Wetzer GmbH+Co. KG, Nesselwang (DE)

(72) Inventor: Marc Schalles, Erfurt (DE)

(73) Assignee: Endress+Hauser Wetzer GmbH+Co. KG, Nesselwang (DE)

( * ) Notice: Subject to any disclaimer, the term of this patent is extended or adjusted under 35 U.S.C. 154(b) by 327 days.

(21) Appl. No.: 16/476,783

(22) PCT Filed: Dec. 6, 2017

(86) PCT No.: PCT/EP2017/081686
§ 371 (c)(1),
(2) Date: Jul. 9, 2019

(87) PCT Pub. No.: WO2018/127348
PCT Pub. Date: Jul. 12, 2018

(65) Prior Publication Data
US 2019/0360877 A1 Nov. 28, 2019

(30) Foreign Application Priority Data
Jan. 9, 2017 (DE) .................... 10 2017 100 264.2

(51) Int. Cl.
| | | |
|---|---|---|
| *G01K 15/00* | (2006.01) | |
| *G01K 7/34* | (2006.01) | |
| *G01K 7/36* | (2006.01) | |

(52) U.S. Cl.
CPC ............ *G01K 15/005* (2013.01); *G01K 7/34* (2013.01); *G01K 7/36* (2013.01)

(58) Field of Classification Search
CPC .......... G01K 11/00; G01K 7/38; G01K 15/00; G01K 7/00; G01K 15/002; G01K 1/16;
(Continued)

(56) References Cited

U.S. PATENT DOCUMENTS

| | | | | |
|---|---|---|---|---|
| 3,274,567 A | * | 9/1966 | Fatuzzo | H03K 17/78 365/117 |
| 3,311,842 A | | 3/1967 | Beck | |

(Continued)

FOREIGN PATENT DOCUMENTS

| | | | | |
|---|---|---|---|---|
| CA | 3049707 A1 | * | 7/2018 | G01K 15/00 |
| CA | 3049709 A1 | * | 7/2018 | G01K 15/002 |

(Continued)

OTHER PUBLICATIONS

Garcia, F., Cernicchiaro, G. R.C. and Takeuchi, A. Y., A magnetic phase transition temperature calibration device, Journal of Applied Physics, vol. 85, No. 8, Apr. 15, 1999, 3 pp. (5154-5156).

*Primary Examiner* — Gail Kaplan Verbitsky
(74) *Attorney, Agent, or Firm* — Mark A. Logan; Endress+Hauser (USA) Holding, Inc.

(57) ABSTRACT

The present disclosure relates to a device for determining and/or monitoring temperature of a liquid, comprising a temperature sensor, a reference element for in-situ calibration and/or validation of a temperature sensor and an electronics unit, wherein the reference element is composed at least partially of a material, in the case of which at least one phase transformation occurs at at least a first predetermined phase transformation temperature in a temperature range relevant for calibrating the temperature sensor, in which phase transformation the material remains in the solid phase. According to the present disclosure, the electronics unit is embodied to supply the reference element with a dynamic excitation signal. Furthermore, the present disclosure relates to a method for calibration and/or validation of a temperature sensor based on a device of the invention.

12 Claims, 4 Drawing Sheets

(58) Field of Classification Search
CPC .......... G01K 7/34; G01K 7/36; G01K 15/005;
G01K 7/343; G01K 7/02; G01K 11/26;
G01N 11/16; G01N 2009/006; G01N
27/221; G01N 27/228; G01N 9/002
USPC .............................. 374/1, 141, 183, 184, 185
See application file for complete search history.

(56) References Cited

U.S. PATENT DOCUMENTS

| | | | | |
|---|---|---|---|---|
| 4,902,895 | A * | 2/1990 | Hanson | G01J 5/20 250/338.2 |
| 5,330,268 | A * | 7/1994 | Klein | G01N 25/08 324/694 |
| 5,788,373 | A * | 8/1998 | Huetter | G01N 25/4866 374/10 |
| 6,220,748 | B1 * | 4/2001 | Bates | G01K 13/125 374/10 |
| 6,664,793 | B1 * | 12/2003 | Sampson | G01N 27/221 324/439 |
| 6,819,194 | B2 * | 11/2004 | Toncich | H01L 27/0808 331/158 |
| 9,417,292 | B1 * | 8/2016 | Chang | G01K 7/38 |
| 9,719,863 | B1 * | 8/2017 | Chang | G01K 7/38 |
| 9,733,223 | B2 * | 8/2017 | Ruellan | G01N 30/62 |
| 10,495,526 | B2 * | 12/2019 | Schalles | G01K 15/002 |
| 11,035,739 | B2 * | 6/2021 | Vaiana | G01K 7/01 |
| 11,187,596 | B2 * | 11/2021 | Umkehrer | G01K 7/16 |
| 2002/0149434 | A1 * | 10/2002 | Toncich | H01P 1/203 331/158 |
| 2006/0115204 | A1 * | 6/2006 | Marsh | G01K 11/3206 385/12 |
| 2008/0013591 | A1 | 1/2008 | Kim et al. | |
| 2008/0147292 | A1 * | 6/2008 | Remele | F02D 41/2096 701/102 |
| 2012/0051389 | A1 * | 3/2012 | Schalles | G01K 15/002 374/1 |
| 2015/0226713 | A1 * | 8/2015 | Ruellan | G01N 27/18 73/23.4 |
| 2015/0285693 | A1 * | 10/2015 | Schalles | G01K 15/005 374/1 |
| 2016/0047699 | A1 * | 2/2016 | Seefeld | G01K 7/34 374/1 |
| 2016/0252405 | A1 * | 9/2016 | Liu | G01K 7/38 374/163 |
| 2019/0360877 | A1 | 11/2019 | Schalles | |

FOREIGN PATENT DOCUMENTS

| | | | |
|---|---|---|---|
| CN | 1967607 A | 5/2007 | |
| CN | 103154686 A | 6/2013 | |
| CN | 105318979 A | 2/2016 | |
| DE | 249355 A1 | 9/1987 | |
| DE | 4032092 C2 | 6/1994 | |
| DE | 19702140 A1 | 7/1998 | |
| DE | 69130843 T2 | 6/1999 | |
| DE | 19805184 A1 | 8/1999 | |
| DE | 19841770 A1 * | 4/2000 | .......... F01N 3/2066 |
| DE | 19941731 A1 | 3/2001 | |
| DE | 10258845 A1 | 1/2004 | |
| DE | 102004027072 B3 | 2/2006 | |
| DE | 102010040039 A1 | 3/2012 | |
| DE | 102010040039 A1 * | 3/2012 | .......... G01K 15/002 |
| DE | 102015112425 A1 | 2/2017 | |
| DE | 102017100263 A1 * | 7/2018 | |
| DE | 102019103077 A1 * | 8/2020 | |
| DE | 102019103677 A1 * | 8/2020 | |
| DE | 102019134019 A1 * | 6/2021 | |
| DE | 102019134891 A1 * | 6/2021 | |
| EP | 1247268 B2 | 8/2009 | |
| EP | 3566033 A1 | 11/2019 | |
| JP | 5590460 B2 | 9/2014 | |
| RU | 91426 U1 | 2/2010 | |
| RU | 2538930 C2 | 1/2015 | |
| SU | 1275232 A1 | 12/1986 | |
| WO | WO-2005010471 A1 * | 2/2005 | .......... G01F 23/246 |
| WO | 2010097279 A2 | 9/2010 | |
| WO | 2010097279 A3 | 9/2010 | |
| WO | WO-2017016776 A1 * | 2/2017 | .......... G01K 15/005 |
| WO | 2018127348 A1 | 7/2018 | |
| WO | WO-2018127313 A1 * | 7/2018 | ............. G01K 15/00 |
| WO | WO-2019228986 A1 * | 12/2019 | .......... G01K 15/005 |

* cited by examiner

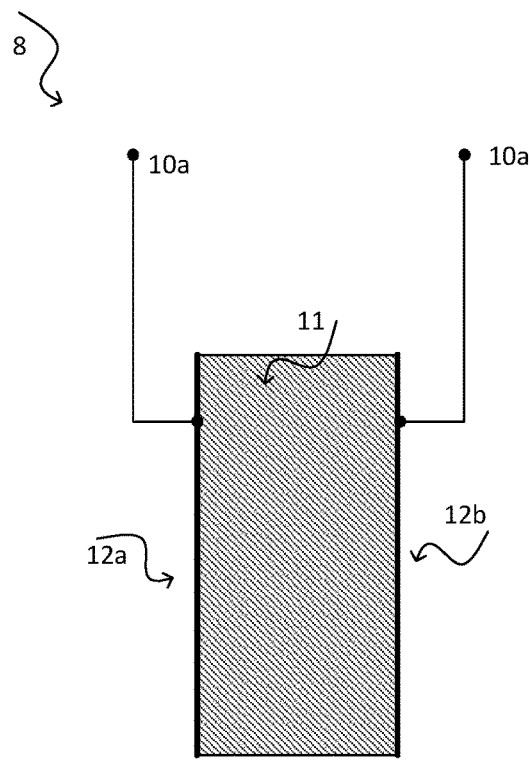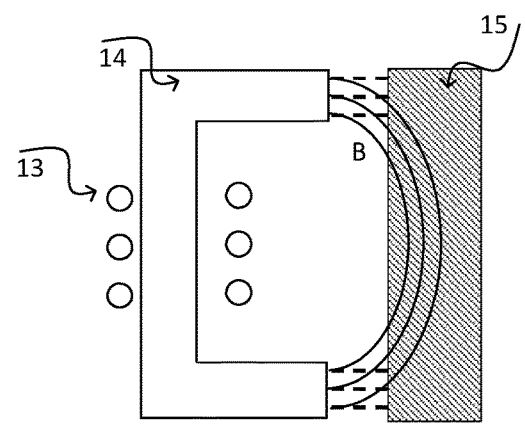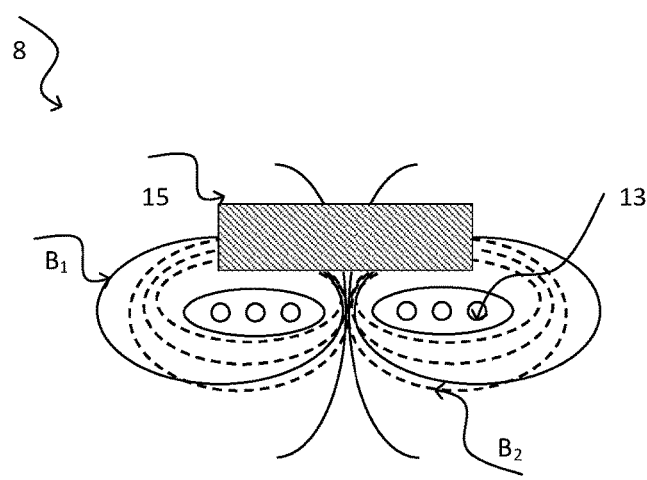
Fig. 3a
Fig. 3b
Fig. 3c
Fig. 3

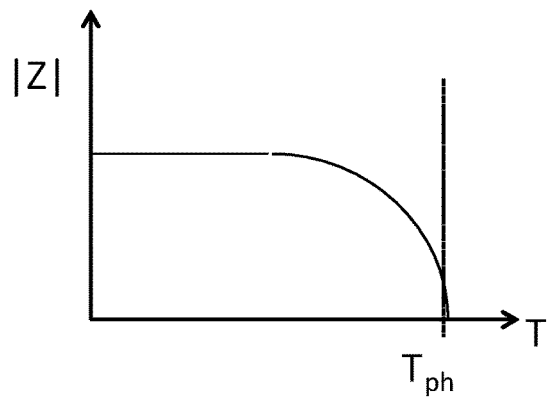
Fig. 4a
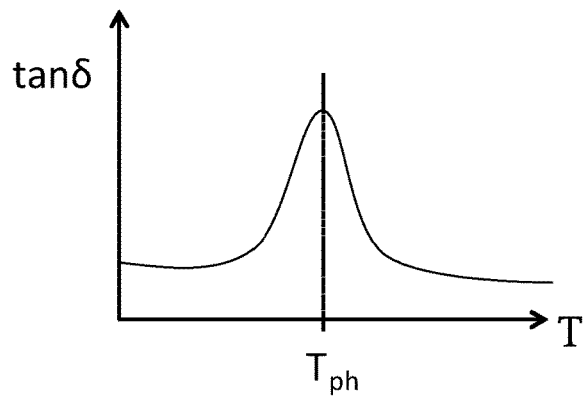
Fig. 4b
Fig. 4
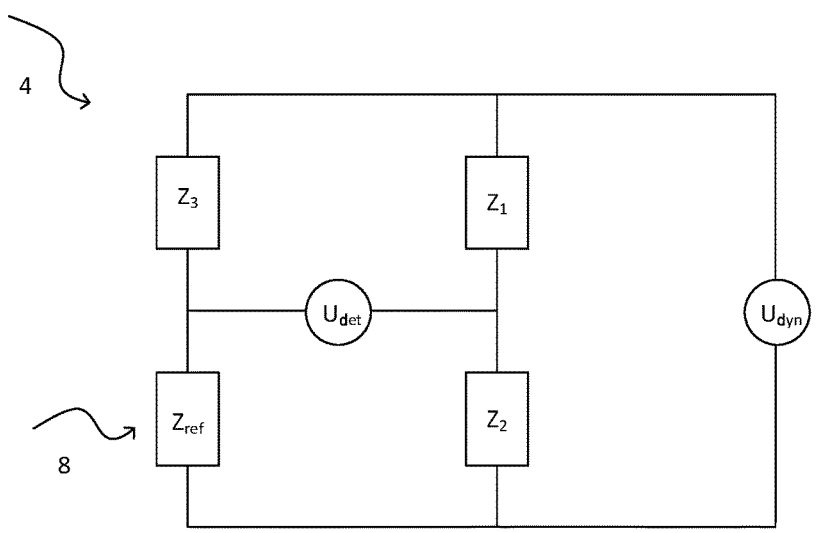
Fig. 5

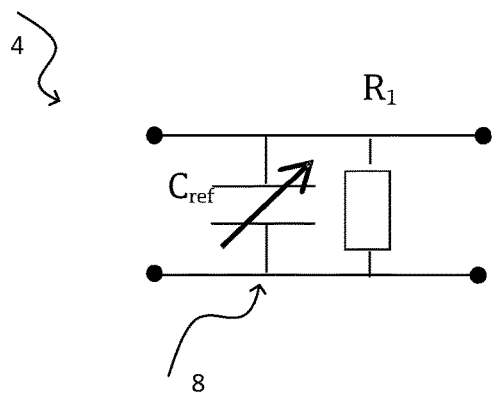
Fig. 6a
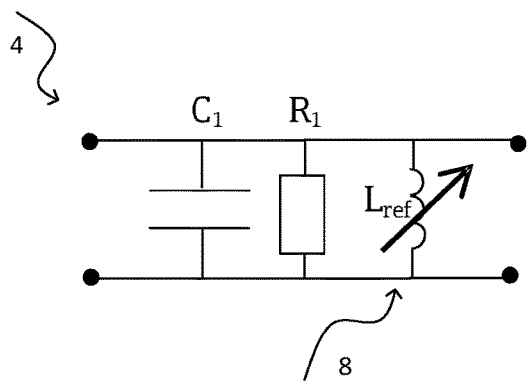
Fig. 6b
Fig. 6
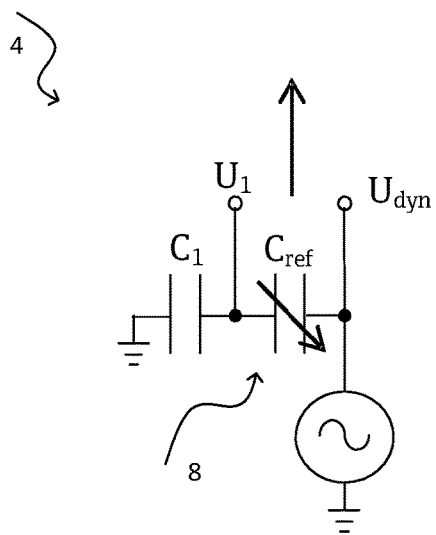
Fig. 7a
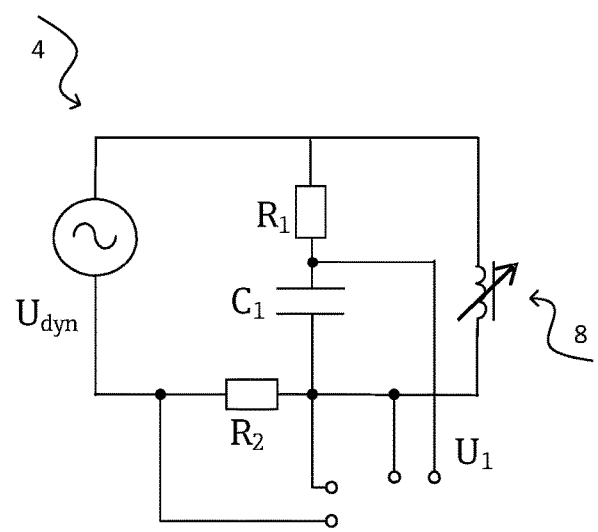
Fig. 7b
Fig. 7

DEVICE AND METHOD FOR THE IN-SITU CALIBRATION OF A THERMOMETER

CROSS-REFERENCE TO RELATED APPLICATIONS

The present application is related to and claims the priority benefit of German Patent Application No. 10 2017 100 264.2, filed on Jan. 9, 2017 and International Patent Application No. PCT/EP2017/081686 filed on Dec. 6, 2017, the entire contents of which are incorporated herein by reference.

TECHNICAL FIELD

The invention relates to a device for determining and/or monitoring temperature of a liquid, comprising a temperature sensor and a reference element. Furthermore, the present invention relates to a method for in-situ calibration and/or validation of a device of the invention.

BACKGROUND

The calibration of thermometers is currently usually performed in calibration baths, ovens or fixed point systems. A corresponding fixed point cell is described, for example, in DE102004027072B3. However, in the case of these methods, usually the thermometer must be deinstalled from the measuring point. In order, in contrast, to be able to calibrate a thermometer in the installed state, DE19941731A1 discloses a miniaturized fixed point cell provided in a thermometer. The fixed point cell is filled with a fixed point substance, e.g. a metal or a eutectic alloy. In this case, however, an additional cell is required for encapsulating the fixed point substance, which lessens the dynamic range of the sensor, especially deteriorates response time to a temperature change. Moreover, it could happen, in given cases, that the fixed point substance could escape from the cell, which could lead to damage or even destruction of the thermometer.

It would thus be desirable to be able to perform a calibration and/or validation of a thermometer in the installed state, thus in-situ, in the case of which the mentioned disadvantages would not occur.

In principle for determining a temperature, the most varied of physical and/or chemical, temperature dependent, material properties can be used. In such case, the property can be either a change, especially an abrupt change, of a particular property, occurring at a certain characteristic temperature point or a continuous change of a property in the form of a characteristic line or curve. For example, the Curie temperature of a ferromagnetic material is a characteristic temperature point for the material. In this regard, known from DE 4032092C2 is a method for ascertaining the Curie temperature, in the case of which by means of a differential scanning thermal analyzer an abrupt change of the absorbed amount of heat is detected in the region of the Curie temperature. In DE19702140A1, in turn, described are a device and a method for measuring the temperature of a rotating support part with a temperature sensor, which has a ferro- or paramagnetic material, which exhibits a temperature dependent change of its polarization in the temperature range of interest. Thus, a characteristic line or curve of temperature dependent polarization is taken into considering for determining temperature.

A further example known from DE19805184A1 describes the ascertaining of temperature of a piezoelectric element based on its capacitance. Similarly, DE69130843T2 concerns a method and a device for determining temperature of a piezoelectric crystal oscillator.

The use of certain characteristic temperature points or characteristic line or curves is suited basically also for calibrating and/or validating thermometers.

Thus, in EP1247268B2, for example, a method for in-situ calibration of a plurality of integrated temperature sensors based on characteristic lines or curves of one or more reference elements in the form of secondary temperature sensors is described. The reference elements are installed in a thermometer insert supplementally to a primary temperature sensor. In order that a calibration can occur, the utilized reference elements differ from the primary temperature sensor with reference to construction and/or applied material. This results in different characteristic lines or curves. Disadvantageous in such case, however, is that the characteristic lines or curves of the reference elements are usually subject to aging effects and/or sensor drift.

For preventing such disadvantages, known from DE102010040039A1 are a device and a method for in-situ calibration of a thermometer having a temperature sensor and a reference element for calibrating the temperature sensor, in the case of which the reference element is composed at least partially of a ferroelectric material, which experiences a phase transformation at at least one predetermined temperature in the temperature range relevant for calibrating the temperature sensor. The calibration is thus performed based on the characteristic temperature point of a phase transformation of a ferroelectric material, thus based on a material-specific property. Depending on number of installed reference elements, in this way, both a so-called 1-point- as well as also a multipoint-calibration and/or validation can be performed. A similar device, especially suitable for multipoint calibrations, is, furthermore, known from this applicant's German patent application No. 102015112425.4, filed Jul. 29, 2016, and unpublished at the date of first filing of this application. The thermometer described there includes at least one temperature sensor and at least two reference elements contacted via exactly two connection wires. The reference elements are composed at least partially of two different materials, each of which has in the temperature range relevant for calibrating the temperature sensor at least one phase transformation at least of second order at, in each case, a predetermined phase transformation temperature. DE 102010040039A1 (U.S. Pat. No. 9,091,601) as well as DE 102015112425.4 (US 2018217010) are incorporated here by reference.

SUMMARY

Starting from the state of the art, an object of the present invention is to provide an alternative for in-situ calibration and/or validation of a temperature sensor.

The object is achieved by a device for determining and/or monitoring temperature of a liquid as defined in claim 1 as well as by a method for in-situ calibration and/or validation of a device of the invention as defined in claim 14.

As regards the device of the invention, the object is achieved by a device for determining and/or monitoring temperature of a liquid, comprising a temperature sensor, a reference element for in-situ calibration and/or validation of a temperature sensor and an electronics unit. The reference element is composed at least partially of a material, in the case of which at least one phase transformation occurs at at least a first predetermined phase transformation temperature in a temperature range relevant for calibrating the temperature sensor. In the phase transformation, the material remains in the solid phase. According to the invention, the electronics unit is embodied to supply the reference element with a dynamic excitation signal.

The thermometer of the invention is advantageously embodied for in-situ calibration and/or validation of at least a first temperature sensor. For this, the temperature sensor (primary sensor) is calibrated and/or validated using a secondary sensor (reference element).

Upon a phase transformation in a material, which remains in the solid phase, involved, for example, according to the Ehrenfest classification, is a phase transformation at least of second order. In contrast with a phase transformation of first order, no or only a negligible amount of latent heat is released during the phase transformation. When no or only a negligible amount of latent heat is released, it can—basically and independently of the selected classification for phase transformations—, among other things, be advantageously assured that the temperature measured by means of the temperature sensor at the point in time of the occurrence of a phase transformation, is not corrupted, especially not by released, latent heat.

In an additional classification of phase transformations significantly more usual in the present state of the art, it is distinguished only between discontinuous (first order) and continuous (second order) phase transformations [compare e.g. Lexikon der Physik, Spektrum Akademischer Verlag, Heidelberg, Berlin, Vol. 4, under the entry "Phasenübergänge and andere kritische Phänomene" (Phase Transformations and Other Critical Phenomena)]. According to this classification, various ferroelectric materials can be associated with both phase transformations of first as well as also second order, wherein in both cases the particular material, for which a phase transformation occurs, remains in the solid phase during the phase transformation.

The remaining in the solid phase is important for the present invention independently of the selected classification of a phase transformation. A material remaining in the solid state is especially advantageous with reference to structural aspects of the system, especially the monitoring unit.

A phase transformation includes a discontinuity in the second derivative of a thermodynamic variable, such as, for example, the pressure, the volume, the enthalpy, or the entropy as a function, for example, of temperature. Typically, phase transformations involve the change of a certain specific material property, for example, alternation in the crystal structure, or alternation in the magnetic, electrical or dielectric properties. Corresponding material-specific parameters are known for the particular reference element and can be taken into consideration for a calibration and/or validation of a temperature sensor. In such case, the at least one reference element can have one or more phase transformations, especially phase transformations in the solid phase of the utilized material. Each phase transformation occurs at a certain characteristic, fixed and long term stable, temperature value, so that, in principle, no drift and/or no aging effects need to be taken into consideration for the reference element.

Since the reference element is supplied with a dynamic excitation signal, especially an excitation signal dynamic with respect to time, other characteristic parameters can be taken into consideration for detecting the occurrence of the at least one phase transformation, characteristic parameters which are not available in the case of a static excitation signal.

During the phase transformation, depending on embodiment of the reference element, typically changing, for example, is the permittivity, or the magnetic permeability, of the material, in which the phase transformation occurs. These characteristic parameters can, depending on embodiment of the reference element, be registered by means of various measuring principles, for example, based on capacitance or inductance. In the case of considering the capacitance or inductance, the permittivity, or permeability, results from real- and imaginary parts. The imaginary parts can, in turn, in the case of supply of electrical power to the reference element by means of a dynamic excitation signal, be directly registered. The supply of electrical power to the reference element by means of a dynamic excitation signal permits, thus, advantageously, the direct registering of phase transformation dependent, characteristic parameters.

The electronics unit is, furthermore, preferably embodied, based on a received signal received from the reference element, to detect the occurrence of the at least one phase transformation. Using a comparison of the phase transformation temperature with a temperature of the liquid measured essentially at the same time by means of the temperature sensor, then a calibration and/or validation of a temperature sensor can be performed. Especially, the received signal is likewise a dynamic received signal, especially a received signal dynamic with respect to time.

In an embodiment, the excitation signal and/or a received signal received from the reference element is, in each case, a sinusoidal, rectangular, triangular, sawtooth shaped or pulse shaped signal, especially an electrical current- or voltage signal. It is, thus, for example, an alternating electrical current or an alternating voltage.

In an advantageous embodiment of the device of the invention, the at least one material, of which the reference element is composed at least partially, is a ferroelectric material, a ferromagnetic material or a superconducting material, especially a high temperature superconductor. Correspondingly, the at least one phase transformation is a phase transformation from the ferroelectric into the paraelectric state or vice versa, from the ferromagnetic state into the paramagnetic state or vice versa, or from the superconducting state into the normally conducting state or vice versa. The phase transformation temperature is correspondingly, for example, the Curie temperature of a particular material or the so-called critical temperature.

Another embodiment provides that the electronics unit is constructed to vary the frequency and/or the amplitude of the excitation signal. The electronics unit is thus suitable especially for performing an impedance-spectroscopy and/or for performing a frequency-sweep, in the case of which especially a predeterminable frequency range is systematically moved through with discrete frequencies for the excitation signal. If one considers, for example, polarization, or a variable dependent or derived from polarization, as characteristic parameter for detecting the phase transformation of a particular material, of which the reference element is at least partially composed, the polarization can have different causes. For example, it can be an electronic, a molecular, a dipolar or also an ionic polarization. Since a suitable frequency is selected for the excitation signal, individual mechanisms underpinning the polarization can be selected with targeting. The occurrence of a phase transformation is thus detectable based frequency dependently on a polarization.

For the reference element of the invention, many different embodiments are possible, which all fall within the scope of the present invention. The two options for embodiment of the reference element to be described here are, thus, by way of example, and to be seen, in fact and form, in no way as an exclusive listing.

In a first preferred embodiment, the reference element is a capacitor element having a dielectric, wherein the dielectric is composed at least partially of the material, in the case of which of the at least one phase transformation occurs. For this embodiment, it is correspondingly expedient to detect the occurrence of the at least one phase transformation based on a capacitance or on a variable dependent on the capacitance.

An alternative preferred embodiment includes that the reference element is a coil arrangement having at least one coil and a magnetically conductive body, wherein the body is composed at least partially of the material, in the case of which of the at least one phase transformation occurs. In the case of this embodiment, it is, in turn, expedient to detect the at least one phase transformation based on an inductance or a variable dependent on the inductance.

The choice of the special embodiment of the reference element depends, on the one hand, on the particular embodiment of the thermometer. Furthermore, the embodiment of the reference element depends also on the characteristic parameter referenced for detecting the phase transformation, or the suitable characteristic variable depends on the particular embodiment of the reference element.

In the case of a dynamic excitation signal, especially an excitation signal dynamic with respect to time, and depending on embodiment of the reference element and the particular thermometer, especially the electronics unit, which, for example, includes an, especially electronic, measurement circuit suitable for registering a particular variable, suitable characteristic parameters include, for example, the capacitance, the inductance, the impedance or also the loss angle.

Thus, in an especially preferred embodiment, it is provided that the electronics unit is embodied to ascertain an impedance, or a variable dependent on the impedance, of at least one component of the reference element, and to detect the occurrence of the phase transformation based on the impedance, or the variable dependent on the impedance, especially based on the line or curve of impedance or the variable dependent on the impedance as a function of time and/or temperature.

Another especially preferred embodiment includes that the electronics unit is embodied to ascertain a loss angle, or a variable dependent on the loss angle, of at least one component of the reference element, and to detect the occurrence of the phase transformation based on the loss angle or the variable dependent on the loss angle, especially based on the line or curve of the loss angle, or the variable dependent on the loss angle, as a function of time and/or temperature.

Still another especially preferred embodiment includes that the electronics unit is embodied to ascertain a capacitance, an inductance, or a variable dependent on the capacitance and/or inductance, of at least one component of the reference element, and to detect the occurrence of the phase transformation based on the capacitance, the inductance or the variable dependent on the capacitance and/or inductance, especially based on the line or curve of the capacitance, the inductance, or the variable dependent on the capacitance and/or inductance, as a function of time and/or temperature.

Also for the utilized measuring circuits, or the electronics unit, the most varied of embodiments are available, by means of which the different characteristic parameters can be registered. A series of especially preferred examples of embodiments is presented below. Of course, these are in no way to be considered an exclusive listing. Rather, many other suitable measuring principles in the state of the art are available, which likewise fall within the scope of the present invention.

In an embodiment, the electronics unit includes a bridge circuit, especially a Wien bridge or a Wien-Maxwell bridge, wherein the reference element is a component of the bridge circuit. The measuring principles underpinning such a bridge circuit are known per se from the state of the art and are, consequently, not explained here in further detail. Advantageously, a bridge circuit is suited also for registering the temperature of a particular liquid, when the temperature sensor is embodied, for example, in the form of a resistance element. In contrast with bridge circuits for application with static excitation signals, especially excitation signals static with respect to time, in the case of bridge circuits for dynamic signals, especially signals dynamic with respect to time, such as, for example, alternation signals, no thermovoltages arising within such a bridge circuit corrupt the measurement result, or received signal. In the case, in which both the phase transformation is detected, as well as also the temperature of the liquid ascertained, by means of the bridge circuit, such is a constructively especially simple embodiment of the present invention. A bridge circuit can especially preferably be applied for determining the phase transformation dependent impedance.

In another embodiment, the electronics unit includes an electrical oscillation circuit, wherein the reference element is a component of the oscillatory circuit. The oscillatory circuit can be, for example, an RL-, RC, or RCL oscillatory circuit. Also by means of an oscillatory circuit, temperature can basically be ascertained, for example, based on a temperature sensor embodied as a resistance element. In the case of an oscillatory circuit, suitable, for example, for detecting the phase transformation is the registering of a time constant, based on which for a reference element embodied as a capacitor element, or as a coil arrangement, for example, the capacitance or inductance is determinable.

For this embodiment, it is, furthermore, advantageous that the electronics unit be embodied to detect the occurrence of the at least one phase transformation based on a change of a resonant frequency of the oscillatory circuit. The characteristic parameter for these embodiments is thus the resonant frequency of the oscillatory circuit, which experiences a change, especially a jump-like change, upon the occurrence of the at least one phase transformation.

Finally the device includes in an embodiment means for applying a field, especially an electrical, or magnetic, field, wherein the electronics unit is embodied to detect the occurrence of the at least one phase transformation based on at least one hysteresis diagram.

Independently of the particular embodiment of the reference element, the particular embodiment of the electronics unit and the, in each case, characteristic variable referenced for detecting the phase transformation, it is, finally, advantageous that the electronics unit be embodied to supply the temperature sensor with a dynamic excitation signal. Such an embodiment is distinguished advantageously by an especially simple construction. Depending on concrete embodiment, both the reference element as well as also the temperature sensor can be operated and read-out simultaneously by means of an electronic arrangement.

The object of the invention is, furthermore, achieved by a method for in-situ calibration and/or validation of a device of the invention, wherein a reference element is supplied with a dynamic excitation signal.

The embodiments explained in connection with the device can also be applied mutatis mutandis for the proposed method.

BRIEF DESCRIPTION OF THE DRAWINGS

The invention will now be explained in greater detail based on the appended drawing. Equal elements of the device are provided with equal reference characters. The figures of the drawing show as follows:

FIG. 3 shows a second embodiment of a device of the present disclosure with two temperature sensors and a reference element according to the present disclosure, FIG. 4 shows a schematic representation of an embodiment of the reference element as (a) a capacitor element and (b) as a coil arrangement FIG. 5 shows a schematic representation of an electronics unit with a bridge circuit for a reference element (a) in the form of a capacitor element and (b) in the form of a coil arrangement, FIG. 6 shows a schematic representation of an electronics unit in the form of an oscillatory circuit for a reference element (a) in the form of a capacitor element and (b) in the form of a coil arrangement, and FIG. 7 shows a schematic representation of an electronics unit, which is suitable for detecting a phase transformation based on a hysteresis diagram, for a reference element (a) in the form of a capacitor element and (b) in the form of a coil arrangement.

DETAILED DESCRIPTION

Figure 1:
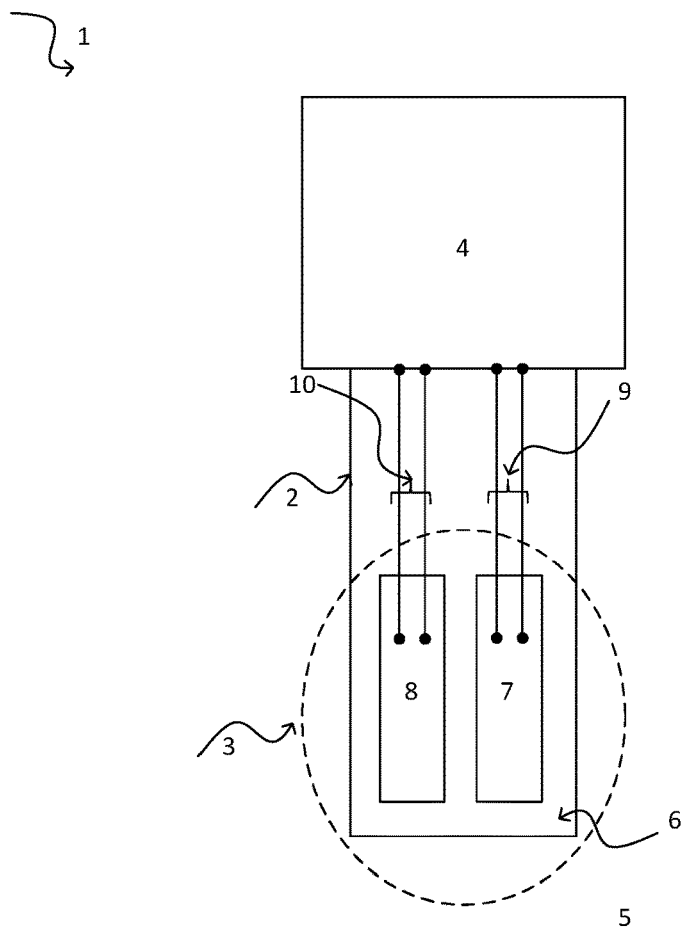
FIG. 1 shows a schematic representation of a thermometer having a temperature sensor and a reference element for in-situ calibration and/or validation of a temperature sensor according to the state of the art.

FIG. 1 is a schematic view of a thermometer 1 with a protective tube 2 and an electronics unit 4 according to the state of the art, which thermometer is suitable an in-situ calibration and/or validation. The portion of the protective tube 2 facing the liquid 5 is also referred to as the sensor head 3. The internal volume of the sensor head 3 is filled with a filler 6, especially an electrically insulating filler 6, especially a cement. Furthermore, arranged in the interior of the sensor head 3 are a temperature sensor 7 and a reference element 8, each of which is contacted, especially electrically contacted, by means of at least two connection wires, 9,10 and connected with the electronics unit 4. Temperature sensor 7 is, for example, a resistance element or a thermocouple. Reference element 8 is, in turn, composed at least partially of a material, in the case of which at least one phase transformation at least of second order occurs at at least one predetermined phase transformation temperature within the temperature range relevant for operation of the device. The number of needed connection wires 9,10 for contacting the reference element and the temperature sensor 7,8 can vary, depending on type of applied measuring principle. In the illustrated embodiment, the temperature sensor 7 and the reference element 8 are arranged mutually spaced within the same sensor head 3. They can, however, likewise directly contact one another and, for example, be soldered together.

Figure 2:
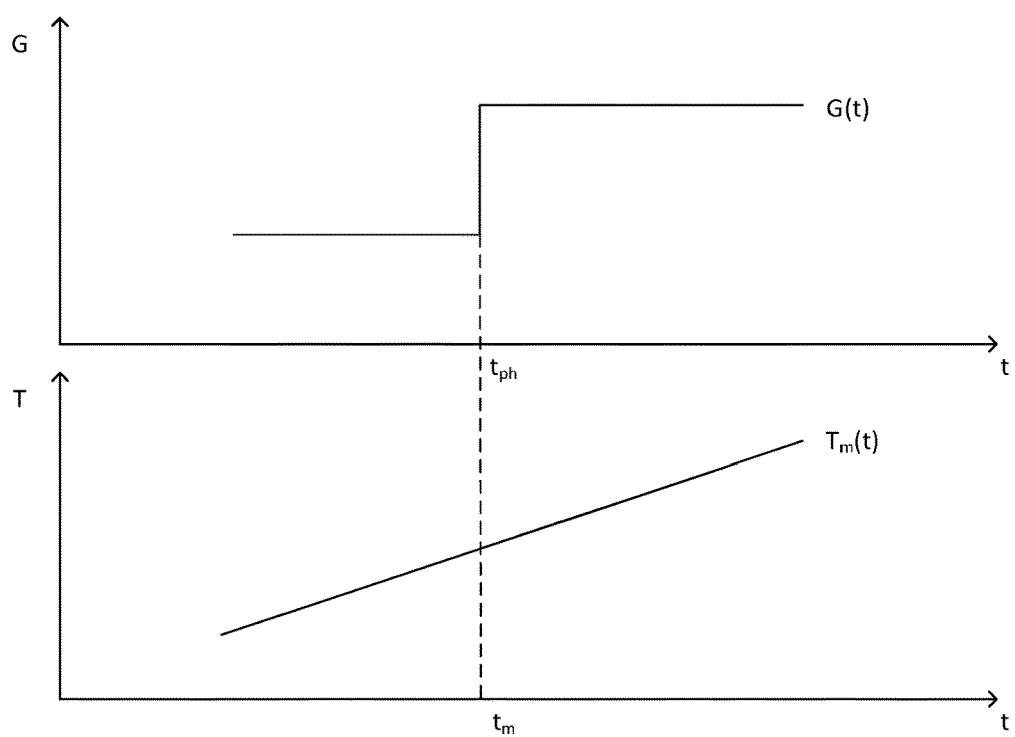
FIG. 2 shows a schematic representation of a calibration and/or validation of a temperature sensor based on the reference element.

Calibration and/or validation of the temperature sensor 7 by means of the reference element 8 is illustrated in FIG. 2. The upper graph represents the curve of a characteristic physical or chemical variable G used for detecting the phase transformation. If a phase transformation occurs in the reference element 8, then there occurs in the illustrated example an abrupt change of the variable G.

The point in time, at which the abrupt change of the variable is detected, is the phase transformation point in time $t_{ph}$, at which the reference element 8 has the phase transformation temperature $T_{ph}$.

In the lower graph, the sensor temperature T is ascertained by means of the temperature sensor 7 as a function of time t. For calibration and/or validation of a temperature sensor 7 based on the reference element 8, for example, that measurement point in time $t_m$ is ascertained, which has the shortest time separation from the phase transformation point in time $t_{ph}$. The sensor temperature $T_m$ corresponding to the measurement point in time $t_m$ is compared with the phase transformation temperature $T_{ph}$. Using the comparison, then a calibration and/or validation can be performed. Moreover, in the case of a difference $\Delta T = T_m(t_m) - T_{ph}(t_{ph})$ above a predeterminable limit value, the thermometer 1 can be adjusted and/or a report concerning the occurrence of a difference generated and/or output.

Three possible embodiments for the reference element 8 are shown in FIG. 3 by way of example. Suited in the case of a ferroelectric material, for example, is an embodiment of the reference element 8 in the form of a capacitor element, as shown in FIG. 3a. The material 11, in which the phase transformation occurs, forms the dielectric in this case. The reference element 8 includes, furthermore, two electrodes 12a and 12b, which in the example shown here is arranged directly on two oppositely lying, lateral surfaces of the material 11, which is embodied as an essentially cuboidal body and electrically contacted by means of the two connection lines 10a and 10b, in order, for example, to detect the capacitance $C_{ref}$ of the reference element 8 and based on an especially abrupt change of the capacitance $C_{ref}$ to detect the phase transformation. For other details of this embodiment of the reference element 8 in the form of a capacitor element, reference is made to disclosure document DE102010040039A1.

In the case of a reference element 8 comprising a ferromagnetic material 15, beneficial is an embodiment in the form of a coil arrangement, such as shown, by way of example, in FIGS. 3b and 3c. An opportunity for detecting a phase transformation in the case of such an embodiment of the reference element 8 lies in detecting a change of the inductance $L_{ref}$ of the arrangement. Upon a phase transformation from the ferromagnetic to the paramagnetic state, the magnetic resistance of the material 15, in which the phase transformation occurs, changes, and, thus, for example, also the inductance $L_{ref}$ of the arrangement.

In the embodiment of FIG. 3b, the reference element 8 includes a coil 13 with core 14, and a magnetically conductive body 15, which is composed of the ferromagnetic material. The magnetically conductive body 15 is arranged in such a manner that it is located at least partially in a magnetic field B emanating from the coil 13 with the core 14. The magnetic field is indicated by the sketched field lines. Upon a phase transformation in the magnetically conductive body 15, the magnetic field B changes, which is detectable, for example, based on a change of the inductance L of the arrangement.

The use of a core 14 for the coil 13 is, however, optional. A possible embodiment of the reference element 8 as a coil arrangement without core is correspondingly shown in FIG. 3c. Sketched in this Fig. is, furthermore, by way of example, on the one hand, the magnetic field $B_1$, which reigns, when the material 15 is located in the ferromagnetic state. Moreover, shown in dashed lines is the magnetic field $B_2$, which reigns, when the material 15 is located in the paramagnetic state.

In the case of supply of electrical power to the reference element 8 with a dynamic excitation signal $U_{E,dyn}$, especially an excitation signal dynamic with respect to time, different characteristic parameters of the reference element 8 can be taken into consideration for registering the at least one phase transformation, especially such, which would not be available in the case of a static excitation signal.

Upon a phase transformation in a reference element 8 embodied as a capacitor element as shown in FIG. 3a, for example, the permittivity of the material changes, which, in this case, is present as a dielectric. Suited as characteristic parameter is correspondingly, for example, the capacitance $C_{ref}$. Upon a phase transformation in a reference element 8 embodied as a coil arrangement, as shown in FIG. 3b or FIG. 3c, in contrast, the permeability of the material, here the magnetically conductive body 15, changes. In this case, in turn, the inductance $L_{ref}$ is a suitable characteristic parameter. In the case of considering the capacitance $C_{ref}$ or inductance $L_{ref}$, the permittivity, and permeability, are directly linked with corresponding imaginary parts. These imaginary parts can, in turn, in the case of supply of electrical power to the reference element by means of a dynamic excitation signal, be directly registered.

Besides the capacitance $C_{ref}$ or inductance $L_{ref}$, other characteristic parameters, which in the case of supply of electrical power to the reference element 8 can preferably be registered for detecting the occurrence of a phase transformation, are, for example, the impedance Z or the loss angle δ, such as illustrated in FIG. 4. Although the invention is in no way limited to the mentioned characteristic parameters for detecting a phase transformation, the following description for purposes of simplification concerns the mentioned variables—the inductance L, the capacitance C, the impedance Z as well as the loss angle δ.

For detection of the phase transformation based on the impedance Z or based on the loss angle δ, the reference element 8 can be embodied, for example, corresponding to one of those shown in FIG. 3. FIG. 4a represents the magnitude of the impedance, thus of the alternating current resistance, schematically as a function of temperature. At the phase transformation temperature $T_{ph}$, the impedance is minimum, so that, for example, based on the line or curve of the magnitude of the impedance as a function of time the occurrence of a phase transformation in the reference element 8 can be detected. The loss angle δ, which is the ratio of resistive power to reactive power, is, in contrast, maximum at the phase transformation temperature $T_{ph}$, as shown schematically in FIG. 4b. Also based on the line or curve as a function of time for the loss angle δ, thus the occurrence of a phase transformation can be detected.

If the impedance Z and/or the loss angle δ are, moreover, measured with at least two different excitation signals $U_{E,dyn,1}$ and $U_{E,dyn,2}$ having at least two different frequencies $f_1$ and $f_2$, and the ratio of the impedances $Z(f_1)/Z(f_2)$ or loss angles $\delta(f_1)/\delta(f_2)$ formed, the phase transformation can likewise be registered based on either of these ratios. These ratios are advantageously independent of particular absolute values of particular excitation signals $U_{E,dyn,1}$ and $U_{E,dyn,2}$.

Some especially preferred embodiments of an electronics unit 4 of the invention, which can be used for registering various characteristic parameters, such as the capacitance C, the inductance L, the impedance Z or the loss angle δ, will now be presented in the following figures.

In the embodiment in FIG. 5, the electronics unit 4 includes a bridge circuit with four impedances $Z_1$-$Z_3$ and $Z_{ref}$. The reference element 8 forms at least one component of the bridge circuit, especially the impedance $Z_{ref}$ and at least one of the impedances $Z_1$-$Z_3$ includes at least one electronic component of electrically adjustable size. Depending on embodiment of the reference element 8, the individual impedances $Z_1$-$Z_3$ and $Z_{ref}$ can each be a resistance R, a capacitance C, an inductance L or an arrangement of at least two of the elements R,C,L connected at least partially in series and/or at least partially in parallel.

In the case of embodiment of the reference element 8 in the form of a capacitor element, such is suited, for example, for implementing a so-called Wien bridge. In the case of a reference element 8 embodied as a coil arrangement, the electronics unit 4 comprises, in contrast, preferably a so-called Wien-Maxwell bridge circuit. The measuring principles underpinning these two measuring circuits are known per se in the state of the art, because of which these are not explained here in detailed.

The electronics unit 4, especially the bridge circuit, is excited by means of the dynamic excitation signal $U_{E,dyn}$. The phase transformation dependent impedance Z of the bridge circuit can then be ascertained based on the diagonal voltage $U_{det}$. If the bridge circuit is located in the balanced state, then the diagonal voltage $U_{det}$ is zero, which leads for the particular bridge circuit to a formula, from which, using the known impedances $Z_1$-$Z_3$, the unknown impedance $Z_{ref}$ can be calculated. If the impedance $Z_{ref}$ changes, for example, as a result of a phase transformation in the reference element 8, then the bridge circuit is unbalanced and the diagonal voltage $U_{det}$ is not zero. For detection a change of the phase transformation dependent impedance $Z_{ref}$, one can, for example, rebalance the bridge or instead use a non-zero $U_{det}$. Both methods are known per se in the state of the art.

In the rebalancing method, at least one component of at least one of the known impedances $Z_1$-$Z_3$ is changed, until a balance is achieved anew and the unknown impedance $Z_{ref}$ can be calculated by means of the formula for the balanced condition. Advantageously in the case of such method, only a detection of the zero voltage state of the diagonal voltage $U_{det}$ is necessary. However, the adjustment of the impedances $Z_1$-$Z_3$ and $Z_{ref}$ is comparatively complicated. By utilizing a non-zero $U_{det}$, in contrast, no balancing of the bridge circuit occurs. Instead, the unknown impedance $Z_{ref}$ is ascertained from the measured diagonal voltage $U_{det}$. In this case, however, a more exact voltage measurement is required.

In contrast with bridge circuits for static signals, especially signals static with respect to time, thus, for example, direct voltage measurement bridges, there occurs in the case of alternating voltage bridge circuits advantageously no negative influencing of a particular measurement signal by thermovoltages occurring within the measurement circuit. A further advantage of a bridge circuit for application with a dynamic excitation signal, especially a signal dynamic with respect to time, is that likewise a resistance can be determined by means of a corresponding circuit, besides a parameter characteristic for the reference element 8. In the case, in which the temperature sensor 7 is embodied in the form of a resistance element, thus by means of the same bridge circuit the temperature of a particular liquid 5 can be determined. Such an embodiment is distinguished advantageously by an especially compact construction.

Another opportunity (not illustrated based on a FIG.) for determining the loss angle δ is, for example, to supply the reference element 8 by means of a dynamic excitation electrical current signal, thus by means of an alternating current, and to detect across a suitably selected measuring resistance a received voltage signal, especially an alternating voltage, phase shifted relative to the excitation electrical current signal. Alternatively, it is also possible to use an excitation signal in the form of an alternating voltage and to tap a phase shifted, received signal in the form of an alternating current.

In the case of this embodiment, it is possible, furthermore, based on the amplitude ratio of the instantaneous values of electrical current and voltage to ascertain the impedance $Z=U(t)/I(t)$. Alternatively to the previously described embodiments, the reference element 8 can, for example, embodied in the form of a capacitor element or in the form of a coil arrangement of FIG. 3, be provided in an electrical oscillatory circuit within the electronics unit 4, such as illustrated in FIG. 6. Available as characteristic parameter for detecting the phase transformation, in this case, is preferably a time constant for the reference element 8 or a resonant frequency $f_0$ of the oscillatory circuit.

For the case of a reference element 8 formed as a capacitor element with capacitance $C_{ref}$ as shown in FIG. 6a, for example, an RC oscillatory circuit with the resistance $R_1$ is implementable, which is suitably selected as a function of the reference element 8. In the case of an embodiment of the reference element 8 as a coil arrangement with the inductance $L_{ref}$ as shown in FIG. 6b, in contrast, suited is, for example, an RCL oscillatory circuit with the resistance $R_1$ and the capacitance $C_1$, both of which are selected as a function of the reference element 8. Besides the two shown variants, there are, however, still numerous other embodiments for oscillatory circuits, which likewise fall within the scope of the present invention.

The occurrence of a phase transformation changes the resonant frequency $f_0$ of the oscillatory circuit, so that a change of the resonant frequency $f_0$ of the oscillatory circuit basically can be taken into consideration for detecting the phase transformation at the phase transformation temperature $T_{ph}$.

For ascertaining a time constant, one can, in contrast, for example, proceed in the following way: used as excitation signal is preferably a rectangular signal. In the case of a reference element 8 formed as a capacitor element, then, for example, the time for charging the capacitor element to a predeterminable voltage threshold value is measured. In the case of a reference element 8 embodied as a coil arrangement, in contrast, for example, the time, until an electrical current through the coil sinks below a predeterminable electrical current threshold value, or the time, until a voltage across the coil sinks below a predeterminable voltage threshold value, can be ascertained. The measured time, in each case, is a measure for the capacitance $C_{ref}$ or the inductance $L_{ref}$ of the reference element 8.

Another opportunity is to determine a phase shift between the excitation signal and the received signal, based on which phase shift, for example, likewise the capacitance $C_{ref}$ or the inductance $L_{ref}$ of the reference element 8 can be determined. Finally, it is likewise possible to perform an amplitude modulated measurement in the case of a fixed resistance $R_1$. The amplitude change of the received signal is, in such case, likewise a measure for the capacitance $C_{ref}$ or the inductance $L_{ref}$.

In the case, in which the at least one phase transformation is, in contrast, detected based on a hysteresis diagram, finally, for example, a measurement circuit corresponding to one of the embodiments of FIG. 7 can be used. As in the case of the preceding figures, the reference element 8 is part of an electrical measurement circuit within the electronics unit 4.

For registering a hysteresis diagram, the change of the polarization of a particular material, in which the phase transformation occurs, is registered by applying a time dynamic voltage $U_{E,dyn}$. The particular hysteresis diagram results from plotting voltage $U_1$ as a function of $U_{E,dyn}$. The occurrence of a phase transformation can be detected, for example, based on a change of the ratio of the voltages $U_{E,dyn}$ and $U_1$.

For the embodiment of FIG. 7a, the reference element 8 is a capacitor element with the capacitance $C_{ref}$, such as, for example, in FIG. 3a. Correspondingly, a phase transformation is from the ferroelectric into the paraelectric state or vice versa. Such a measurement circuit is a so-called Sawyer-Tower circuit, which is per se well known from the state of the art and therefore is not described in detail here.

An electrical circuit for detecting a phase transformation in the case of a reference element 8 in the form of a coil arrangement with the inductance $L_{ref}$, such as, for example, in one of the figures, FIG. 3b or FIG. 3c, each of which includes ferromagnetic material, is, in contrast, shown in FIG. 7b. The capacitance $C_1$, as well as the resistances $R_1$ and $R_2$ are, in each case, matched to the applied reference element 8.

The invention claimed is:

1. An apparatus for determining and/or monitoring a temperature of a liquid, comprising:
   a temperature sensor;
   a reference element for in-situ calibration and/or validation of the temperature sensor; and
   an electronics unit,
   wherein the reference element is composed at least partially of a material in which a phase transformation occurs at a first predetermined phase transformation temperature in a temperature range relevant for calibrating the temperature sensor,
   wherein the material is ferroelectric material, and the phase transformation includes a change in a permittivity of the ferroelectric material; or the material is a ferromagnetic material, and the phase transformation includes a change in a magnetic permeability of the ferromagnetic material; or the material is a superconducting material, and the phase transformation includes a change in a conductivity of the material,
   wherein in the phase transformation the material remains in the solid phase, and
   wherein the electronics unit is embodied to:
      supply the reference element and the temperature sensor with a dynamic excitation signal that is a time-varying alternating electrical current or a time-varying alternating voltage;
      receive a dynamic signal from the temperature sensor and determine the temperature of the liquid therefrom;
      receive a dynamic signal from the reference element and detect the phase transformation in the reference element therefrom by detecting the change in the permittivity of the ferroelectric material or the change in the magnetic permeability of the ferromagnetic material or the change in the conductivity of the superconducting material; and
      when the phase transformation is detected, compare the phase transformation temperature with the determined temperature and perform a calibration of the temperature sensor based on the comparison of the phase transformation temperature and the determined temperature.

2. The apparatus as claimed in claim 1, wherein the excitation signal and/or a received signal received from the reference element is, in each case, a sinusoidal, rectangular, triangular, sawtooth-shaped, or pulse-shaped electrical current or voltage signal.

3. The apparatus as claimed in claim 1, wherein the electronics unit is embodied to vary the frequency and/or the amplitude of the excitation signal.

4. The apparatus as claimed in claim 1, wherein the material is the ferroelectric material, and wherein the reference element is a capacitor element having a dielectric composed at least partially of the material in which the phase transformation occurs.

5. The apparatus as claimed in claim 1, the material is the ferromagnetic material, and wherein the reference element includes a coil arrangement having at least one coil and a magnetically conductive body, wherein the magnetically conductive body is composed at least partially of the material in which the phase transformation occurs.

6. The apparatus as claimed in claim 1, wherein the electronics unit is further embodied to ascertain an impedance, or a variable dependent on the impedance, of at least one component of the reference element, and to detect the phase transformation based on the impedance, or the variable dependent on the impedance, based on a line or a curve of the impedance, or the variable dependent on the impedance, as a function of time and/or temperature.

7. The apparatus as claimed in claim 1, the material is the ferroelectric material or the ferromagnetic material, and wherein the electronics unit is further embodied to ascertain a capacitance, an inductance, or a variable dependent on the capacitance and/or the inductance, of at least one component of the reference element, and to detect the phase transformation based on the capacitance, the inductance or the variable dependent on the capacitance and/or the inductance, based on a line or a curve of the capacitance, the inductance or the variable dependent on the capacitance and/or the inductance, as a function of time and/or temperature.

8. The apparatus as claimed in claim 1, wherein the electronics unit includes a bridge circuit, including a Wien bridge or a Wien-Maxwell bridge, and the reference element is a component of the bridge circuit.

9. The apparatus as claimed in claim 1, wherein the electronics unit includes an electrical oscillatory circuit, and the reference element is a component of the oscillatory circuit.

10. The apparatus as claimed in claim 9, wherein the electronics unit is further embodied to detect the phase transformation based on a change of a resonant frequency of the oscillatory circuit.

11. The apparatus as claimed in claim 1, further comprising:
a means for applying an electrical field or a magnetic field,
wherein the electronics unit is further embodied to measure over time an output voltage of the electronics unit and to plot the measured output voltage as a function of the dynamic excitation signal to form a hysteresis diagram, and
wherein the electronics unit is further embodied to detect the phase transformation based on the hysteresis diagram.

12. A method for in-situ calibration and/or validation of an apparatus for determining and/or monitoring a temperature of a liquid, comprising:
providing the apparatus for determining and/or monitoring the temperature of the liquid, including:
a temperature sensor;
a reference element for the in-situ calibration and/or validation of the temperature sensor; and
an electronics unit,
wherein the reference element is composed at least partially of a material in which a phase transformation occurs at a first predetermined phase transformation temperature in a temperature range relevant for calibrating the temperature sensor,
wherein the material is ferroelectric material, and the phase transformation includes a change in a permittivity of the ferroelectric material; or the material is a ferromagnetic material, and the phase transformation includes a change in a magnetic permeability of the ferromagnetic material; or the material is a superconducting material, and the phase transformation includes a change in a conductivity of the material,
wherein in the phase transformation the material remains in the solid phase, and
wherein the electronics unit is embodied to:
supply the reference element and the temperature sensor with a dynamic excitation signal that is a time-varying alternating electrical current or a time-varying alternating voltage;
receive a dynamic signal from the temperature sensor and determine the temperature of the liquid therefrom;
receive a dynamic signal from the reference element and detect the phase transformation in the reference element therefrom by detecting the change in the permittivity of the ferroelectric material or the change in the magnetic permeability of the ferromagnetic material or the change in the conductivity of the superconducting material; and
when the phase transformation is detected, compare the phase transformation temperature with the determined temperature and perform a calibration of the temperature sensor based on the comparison of the phase transformation temperature and the determined temperature;
supplying the reference element and the temperature sensor with the dynamic excitation signal;
receiving the dynamic signal from the temperature sensor and determining the temperature of the liquid therefrom;
receiving the dynamic signal from the reference element and detecting the phase transformation in the reference element therefrom by detecting the change in the permittivity of the ferroelectric material or the change in the magnetic permeability of the ferromagnetic material or the change in the conductivity of the superconducting material; and
when the phase transformation is detected, comparing the phase transformation temperature with the determined temperature and performing the calibration of the temperature sensor based on the comparison of the phase transformation temperature and the determined temperature.

* * * * *